Figure 1:
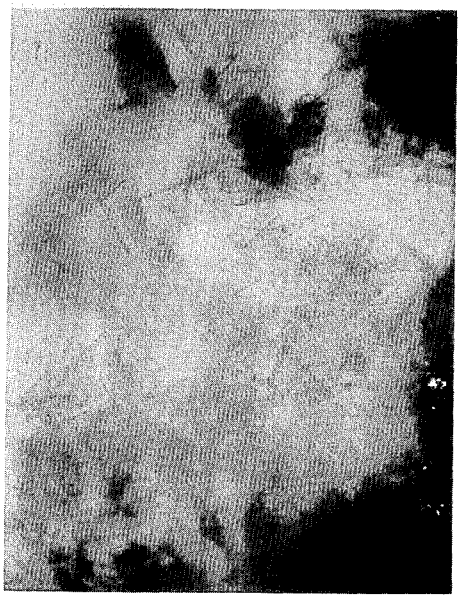

United States Patent [19]
Jacobson

[11] 3,718,494
[45] Feb. 27, 1973

[54] SHEET-LIKE ALPHA ALUMINUM OXIDE

[75] Inventor: Howard W. Jacobson, Wilmington, Del.

[73] Assignee: E. I. du Pont de Nemours and Company, Wilmington, Del.

[22] Filed: March 4, 1971

[21] Appl. No.: 121,001

[52] U.S. Cl. ............. 106/291, 106/308 B, 423/625
[51] Int. Cl. .............................................. C08h 17/04
[58] Field of Search ..... 106/288 B, 308, 291; 23/141, 23/142, 143

[56] References Cited
UNITED STATES PATENTS

| | | | |
|---|---|---|---|
| 3,011,870 | 12/1961 | Webb et al. | 23/142 |
| 3,180,741 | 4/1965 | Wainer et al. | 23/141 |

*Primary Examiner*—James E. Poer
*Attorney*—Donald A. Hoes

[57] ABSTRACT

Single crystals of alpha aluminum oxide are prepared in the form of sheet-like particles having an average thickness of 10 to 250 $\mu$ and major faces averaging 15 to 1,000 m$\mu^2$. The particles find utility in reinforcement of plastics and can also be coated with $TiO_2$ to give a lustrous pigment.

2 Claims, 2 Drawing Figures

|←— 100μ —→|

|←— 3μ —→|

INVENTOR
HOWARD W. JACOBSON

BY Donald A. Hoes

ATTORNEY

SHEET-LIKE ALPHA ALUMINUM OXIDE

BACKGROUND OF THE INVENTION

Alpha aluminum oxide or more simply α-alumina has previously been produced in the form of platelets comprising single crystals. Thus U.S. Pat. No. 3,011,870 describes platelet-like crystals of 0.5 to 10μ in thickness and up to 10 mm in length. The relatively large size of these crystals tends to make them inflexible and easily fracturable. Moreover, as the procedure according to U.S. Pat. No. 3,011,870 involves a high temperature vapor phase process, the yields are quite low, especially for obtaining a reasonably uniform product.

SUMMARY OF THE INVENTION

In accordance with the invention, there are provided sheet-like single crystals of alpha aluminum oxide having an average thickness of 10 to 250 mμ and major faces averaging 15 to 1,000 $\mu^2$. When examined microscopically, the crystals appear as thin, flat, transparent layers.

As will be apparent from the examples hereinafter, the sheet-like α-alumina crystal layers are obtained by the formation of mullite, which chemically is $3Al_2O_3 \cdot 2SiO_2$, in the presence of a reactive fluoride salt such as cryolite, i.e., $Na_3AlF_6$. Upon heating to a temperature of about 1,100°–1,200°C., the fluoride salt reacts with mullite to form $SiF_4$ and α-alumina. The α-alumina is separated from residual salts as small size particles somewhat resembling mica in terms of their layered configuration. Under agitation in an aqueous dispersion, these break down to form the sheet-like single crystals of α-alumina as above described.

A preferred process of the invention involves reaction at a temperature of 850°–950°C. of a blend of
  a. aluminum sulfate, $Al_2(SO_4)_3$, either hydrated or not,
  b. sodium silicate, $Na_2SiO_3$, either hydrated or not,
  c. an alkali metal halide or sulfate, e.g., NaCl, KCl or $Na_2SO_4$,
  d. a reactive fluoride salt, such as $Na_3AlF_6$, NaF, KF, thereby producing mullite. Subsequently the temperature is raised to 1,100°–1,300°C. for at least 10 minutes until the generation of $SiF_4$ is completed.

The following examples further illustrate the invention. Parts therein as well as elsewhere in this specification are by weight unless otherwise indicated. Particle size measurements are determined by microscopic examination. Values for specific surface area are determined by gas adsorption using the well-known B.E.T. method.

EXAMPLE I

This example describes the preparation of thin sheet-like α-alumina platelets.
1. a dry blend is formed of the following:
   337 g $Al_2(SO_4)_3 \cdot 14H_2O$
   100 g $Na_2SiO_3 \cdot 9H_2O$
   100 g NaCl
   75 g $Na_2SO_4$
   35 g $Na_3AlF_6$
2. the mixed ingredients from (1) are added to 140 cc $H_2O$ in a commercial blender.
3. Blending is effected at medium-high speed for 5 minutes, the shear action of the blender causing a 7°–10C. temperature rise.
4. The contents of the blender are poured into a container lined with polytetrafluoroethylene and allowed to gel.
5. The gel is then dried 6 hours at 200°C.
6. The dried gel is then heated in a silica tube to 900°C. and kept at that temperature for 1 hour.
7. The temperature is then increased to 1,175°C. The evolution of $SiF_4$ can be observed. The mass is kept at 1,175°C. for 1 hour.
8. The mass is removed from the silica tube after cooling and leached with hot 20% $H_2SO_4$.
9. The leaching is continued until no further chloride ion is indicated. HF leach (10%) is then carried out to dissolve any traces of mullite or unreacted salts that may be present.
10. The product is recovered by filtration.

The product so obtained is highly pearlescent, being composed of thin platelets, many of which are adhered to one another as laminar composites each containing several thin platelets. By X-ray analysis the product is confirmed as being α-alumina. Individual platelets are transparent sheet-like single crystals about 50 mμ in thickness and 4 to 16μ on an edge. The major faces of the individual single crystals are about 15 to 250 $\mu^2$.

The laminar composites in the product are delaminated by a two minute treatment in aqueous dispersion in a high speed blender. The single crystals prove to be relatively flexible as only modest fracturing occurs in the delamination process. The specific surface of the delaminated product is less than 5 $M^2/g$.

EXAMPLE II

This example describes the utility of sheet-like α-alumina as a plastic reinforcement.

Thus α-alumina flakes produced and delaminated in accordance with the procedure of Example I are dry blended with a commercial 40 mesh nylon molding powder in a 60:40 ratio of nylon:α-alumina. The composite is injection molded at 290°C. into test bar specimens and physical properties are measured thereon as follows:

| Sample | Tensile Strength psi | Tensile Modulus |
|---|---|---|
| Nylon, no additive | 10,000 | 300,000 |
| Nylon, 40% α-alumina | 13,210 | 1,200,000 |

EXAMPLE III

This example describes the utility of micaceous α-alumina as a pearlescent pigment, e.g., for paints and plastics, when provided with a skin comprising a surface coating of titanium dioxide.

To 56 cc of an aqueous titanyl sulfate solution containing 6.5 g $TiO_2$, as titanyl sulfate, there is added with stirring 25 g of the delaminated α-alumina flakes prepared in accordance with Example I. While stirring is continued, 10.5 g 78% $H_2SO_4$ is added over a period of 5 minutes, after which the suspension is heated rapidly to the boil (about 30 minutes) and maintained at the boil under reflux for 3 hours. The product is isolated by filtering and washing with water until the filtrate is essentially free of extraneous ions. After calcining at 900°C. for 30 minutes there is obtained a finely divided flake pigment. The α-alumina flakes in addition to their pearlescence, now exhibit an intense silver color as a result of the interference of light between the core and $TiO_2$ coating.

EXAMPLE IV

The procedure of Example I is repeated using a dry blend of the following:
226 g $Al_2(SO_4)_3·14H_2O$
58 g $Na_2SiO_3·9H_2O$
100 g NaCl
75 g $Na_2SO_4$
17 g $Na_3AlF_6$ The process steps are the same as those employed in Example I except that the calcination at 1,175°C. is carried out for a period of 3 hours.

Figure 2:

Electron micrographs of the product thus obtained, at 300 × and 17,000 × are given in the drawing as FIGS. 1 and 2, respectively. Delamination of the product, which contains some laminar composites and some individual platelets, is effected by dispersing the particles in water under the action of a high speed blender. The delaminated sheet-like single crystals average about 30 m$\mu$ in thickness and about 5 to 30 microns on an edge. The major faces are, by calculation, about 25 to 100 microns². The specific surface of the delaminated product is 10.9M²/g.

EXAMPLE V

The procedure of Example I is repeated except that the quantity of $Al_2(SO_4)_3·14H_2O$ is increased to 453 grams and in place of the 35 grams of $Na_3AlF_6$ there is employed 17 grams NaF. The product so obtained is essentially identical to that of Example I.

What is claimed is:

1. A particulate material consisting essentially of sheet-like crystals of alpha aluminum oxide having an average thickness of 10 to 250 m$\mu$ and major faces averaging 15 to 1,000 $\mu^2$.

2. Lustrous pigmentary material consisting essentially of particles in which a titanium dioxide coating forms a skin about a sheet-like single crystal of alpha aluminum oxide, the crystal having an average thickness of 10 to 250 m$\mu$ and major faces averaging 15 to 1,000 $\mu^2$ in area, the weight ratio of $TiO_2:Al_2O_3$ of the particles being in the range of 1:4 to 2:1.

* * * * *